(12) United States Patent
Malak et al.

(10) Patent No.: US 9,816,389 B2
(45) Date of Patent: Nov. 14, 2017

(54) TURBINE ROTOR BLADES WITH TIP PORTION PARAPET WALL CAVITIES

(71) Applicant: HONEYWELL INTERNATIONAL INC., Morristown, NJ (US)

(72) Inventors: Malak Fouad Malak, Tempe, AZ (US); Mark C. Morris, Phoenix, AZ (US); David Waldman, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1028 days.

(21) Appl. No.: 14/055,568

(22) Filed: Oct. 16, 2013

(65) Prior Publication Data

US 2015/0104327 A1  Apr. 16, 2015

(51) Int. Cl.
  *F01D 11/10* (2006.01)
  *F01D 5/18* (2006.01)
(52) U.S. Cl.
  CPC .............. *F01D 11/10* (2013.01); *F01D 5/187* (2013.01); *F05D 2240/307* (2013.01); *Y02T 50/673* (2013.01); *Y02T 50/676* (2013.01)
(58) Field of Classification Search
  CPC . F01D 11/10; F01D 5/187; F01D 5/18; F01D 5/20; F01D 5/147; Y02T 50/676; Y02T 50/673; F05D 2240/307
  See application file for complete search history.

(56) References Cited

U.S. PATENT DOCUMENTS

| 4,142,824 A | * | 3/1979 | Andersen | ................. F01D 5/20 |
| | | | | 415/115 |
| 4,390,320 A | | 6/1983 | Eiswerth | |
| 4,529,357 A | | 7/1985 | Holland | |
| 4,589,823 A | | 5/1986 | Koffel | |

(Continued)

FOREIGN PATENT DOCUMENTS

| EP | 1281837 A1 | 2/2003 |
| EP | 1422383 A2 | 5/2004 |

(Continued)

OTHER PUBLICATIONS

U.S. Office Action for U.S. Appl. No. 14/030,647 dated Nov. 17, 2016.

(Continued)

*Primary Examiner* — Dwayne J White
*Assistant Examiner* — Adam W Brown
(74) *Attorney, Agent, or Firm* — Lorenz & Kopf, LLP

(57) ABSTRACT

In accordance with an exemplary embodiment, a turbine rotor blade is provided for a turbine section of an engine. The turbine rotor blade includes a platform and an airfoil extending from the platform into a mainstream gas path of the turbine section. The airfoil includes a first side wall; a second side wall joined to the first side wall at a leading edge and a trailing edge; a tip cap extending between the first side wall and the second side wall; a first parapet wall extending from the first side wall; a first parapet wall cavity formed at least partially within the first parapet wall; and a first cooling (Continued)

hole extending between the first parapet wall cavity and a first surface of the first parapet wall such that cooling air flows through the first parapet wall cavity, through the first cooling hole, and out of the first parapet wall.

18 Claims, 7 Drawing Sheets

(56) References Cited

U.S. PATENT DOCUMENTS

| | | | |
|---|---|---|---|
| 5,039,562 | A | 8/1991 | Liang |
| 5,192,192 | A | 3/1993 | Ourhaan |
| 5,282,721 | A | 2/1994 | Kildea |
| 5,688,107 | A | 11/1997 | Downs et al. |
| 5,733,102 | A | 3/1998 | Lee et al. |
| 6,164,914 | A | 12/2000 | Correia et al. |
| 6,179,556 | B1 | 1/2001 | Bunker |
| 6,190,129 | B1 | 2/2001 | Mayer et al. |
| 6,231,307 | B1 | 5/2001 | Correia |
| 6,422,821 | B1 | 7/2002 | Lee et al. |
| 6,478,535 | B1 | 11/2002 | Chung et al. |
| 6,494,678 | B1 | 12/2002 | Bunker |
| 6,527,514 | B2* | 3/2003 | Roeloffs ............ F01D 5/186 416/97 R |
| 6,602,052 | B2 | 8/2003 | Liang |
| 6,634,860 | B2 | 10/2003 | Lee et al. |
| 6,672,829 | B1 | 1/2004 | Cherry et al. |
| 6,790,005 | B2 | 9/2004 | Lee et al. |
| 6,932,571 | B2 | 8/2005 | Cunha |
| 6,981,846 | B2 | 1/2006 | Liang |
| 6,994,514 | B2 | 2/2006 | Soechting et al. |
| 7,192,250 | B2 | 3/2007 | Boury et al. |
| 7,351,035 | B2 | 4/2008 | Deschamps et al. |
| 7,473,073 | B1 | 1/2009 | Liang |
| 7,494,319 | B1 | 2/2009 | Liang |
| 7,510,376 | B2 | 3/2009 | Lee et al. |
| 7,530,788 | B2 | 5/2009 | Boury et al. |
| 7,591,070 | B2 | 9/2009 | Lee |
| 7,695,248 | B2 | 4/2010 | Mons et al. |
| 7,857,587 | B2 | 12/2010 | Correia et al. |
| 7,922,451 | B1 | 4/2011 | Liang |
| 7,972,115 | B2 | 7/2011 | Potier |
| 7,980,818 | B2* | 7/2011 | Kizuka ............ F01D 5/187 415/115 |
| 8,061,987 | B1 | 11/2011 | Liang |
| 8,061,989 | B1 | 11/2011 | Liang |
| 8,075,268 | B1 | 12/2011 | Liang |
| 8,092,178 | B2 | 1/2012 | Marini et al. |
| 8,113,779 | B1 | 2/2012 | Liang |
| 8,182,221 | B1 | 5/2012 | Liang |
| 8,246,307 | B2* | 8/2012 | Cheong ............ F01D 5/20 415/115 |
| 8,366,394 | B1 | 2/2013 | Liang |
| 8,414,265 | B2 | 4/2013 | Willett, Jr. |
| 8,435,004 | B1 | 5/2013 | Liang |
| 8,491,263 | B1 | 7/2013 | Liang |
| 8,777,572 | B2* | 7/2014 | Cheong ............ F01D 5/20 415/115 |
| 2002/0197159 | A1 | 12/2002 | Roeloffs |
| 2003/0021684 | A1 | 1/2003 | Downs et al. |
| 2005/0232771 | A1 | 10/2005 | Harvey et al. |
| 2006/0120869 | A1 | 6/2006 | Wilson et al. |
| 2007/0134096 | A1 | 6/2007 | Mons et al. |
| 2007/0237637 | A1 | 10/2007 | Lee et al. |
| 2008/0118363 | A1 | 5/2008 | Lee et al. |
| 2009/0148305 | A1 | 6/2009 | Riahi et al. |
| 2010/0135813 | A1 | 6/2010 | Marini et al. |
| 2010/0135822 | A1 | 6/2010 | Marini et al. |
| 2010/0221122 | A1 | 9/2010 | Klasing et al. |
| 2011/0176929 | A1 | 7/2011 | Ammann |
| 2012/0070307 | A1 | 3/2012 | Poon et al. |
| 2012/0201695 | A1 | 8/2012 | Little |

FOREIGN PATENT DOCUMENTS

| | | |
|---|---|---|
| EP | 1726783 A1 | 11/2006 |
| EP | 1736636 A1 | 12/2006 |
| EP | 2434097 A1 | 3/2012 |

OTHER PUBLICATIONS

EP Extended Search Report for Application No. 14179939.5 dated Feb. 16, 2015.
U.S. Office Action for U.S. Appl. No. 14/055,521 dated Feb. 9, 2017.
EP Extended Search Report for Application No. 14182739.4 dated Apr. 7, 2015.
EP Search Report, EP 11174595.6-2321 dated May 10, 2011.
Kwak, JS, et al.; Heat Transfer Coefficients and Film Cooling Effectiveness on the Squealer Tip of a Gas Turbine Blade; Turbine Heat Transfer Laboratory, Department of Mechanical Engineering, Texas A&M University, vol. 125, Oct. 2003, Transactions of the ASME, [Retrieved from Internet Jul. 10, 2013] [http://turbomachinery.asmedigitalcollection.asme.org].
Ahn, J, et al.; Film-Cooling Effectiveness on a Gas Turbine Blade Tip Using Pressure-Sensitive Paint; Turbine Heat Transfer Laboratory, Department of Mechanical Engineering, Texas A&M University, Journal of Heat Transfer, vol. 127, May 2005, [Retrieved from Internet Jul. 10, 2013] [http://heattransfer.asmedigitalcollection.asme.org].
U.S. Office Action for U.S. Appl. No. 14/055,521 dated Jun. 1, 2017.
U.S. Office Action for U.S. Appl. No. 14/030,647 dated May 4, 2017.
USPTO Notice of Allowance for U.S. Appl. No. 14/030,647 dated Sep. 1, 2017.
USPTO Notice of Allowance for U.S. Appl. No. 14/055,521 dated Sep. 21, 2017.

* cited by examiner

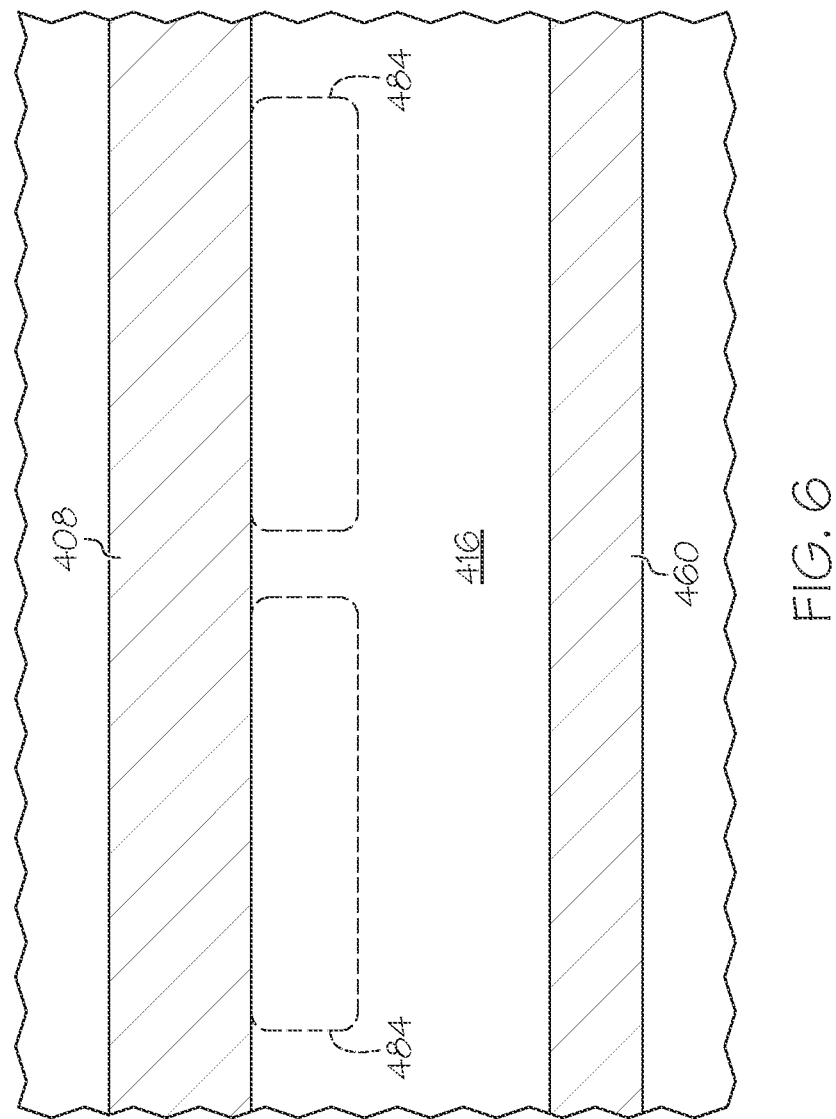

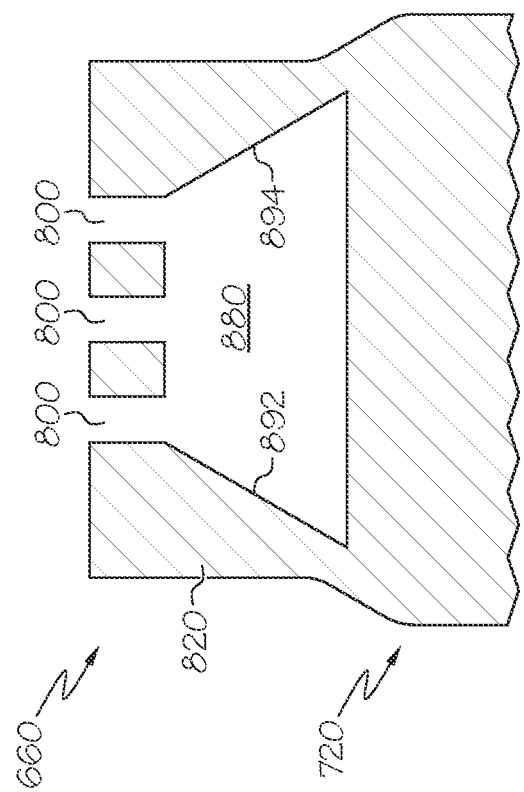
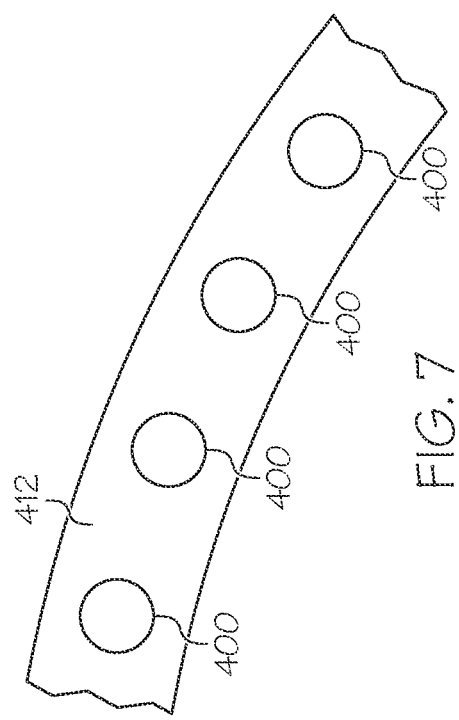

TURBINE ROTOR BLADES WITH TIP PORTION PARAPET WALL CAVITIES

TECHNICAL FIELD

The inventive subject matter generally relates to turbine rotor blades, and more particularly relates to turbine rotor blades with tip portions having improved cooling characteristics.

BACKGROUND

Gas turbine engines are generally used in a wide range of applications, such as aircraft engines and auxiliary power units. In a gas turbine engine, air is compressed in a compressor, mixed with fuel, and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. Operating temperatures may be, for example, 1100° C. As such, it is desirable to cool the rotor blades and stator vanes to prevent or reduce adverse impact and extend useful life. Mechanisms for cooling turbine rotor blades include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge, particularly in areas such as the turbine blade tips. Such blade tip portions may be subject to an acceleration of hot combustion gases leaking between the tip portion and the adjacent shroud, which increases the heat transfer coefficient across the tip portion, and thus, increases the thermal loading.

Accordingly, it is desirable to have a turbine rotor blade with an improved manner for cooling the blade tip portion while maintaining or improving engine efficiency. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In accordance with an exemplary embodiment, a turbine rotor blade is provided for a turbine section of an engine. The turbine rotor blade includes a platform and an airfoil extending from the platform into a mainstream gas path of the turbine section. The airfoil includes a first side wall; a second side wall joined to the first side wall at a leading edge and a trailing edge; a tip cap extending between the first side wall and the second side wall; a first parapet wall extending from the first side wall; a first parapet wall cavity formed at least partially within the first parapet wall; and a first cooling hole extending between the first parapet wall cavity and a first surface of the first parapet wall such that cooling air flows through the first parapet wall cavity, through the first cooling hole, and out of the first parapet wall.

In accordance with another exemplary embodiment, an airfoil for a turbine blade is provided. The airfoil includes a first side wall; a second side wall joined to the first side wall at a leading edge and a trailing edge; a tip cap extending between the first side wall and the second side wall; a first parapet wall extending from the first side wall; a first parapet wall cavity formed at least partially within the first parapet wall; and a first cooling hole extending between the first parapet wall cavity and a first surface of the first parapet wall such that cooling air flows through the first parapet wall cavity, through the first cooling hole, and out of the first parapet wall.

BRIEF DESCRIPTION OF THE DRAWINGS

The inventive subject matter will hereinafter be described in conjunction with the following drawing figures, wherein like numerals denote like elements.

FIG. 6 is a simplified, close up, cross-sectional view of the tip portion of the turbine rotor blade through line 6-6 of FIG. 4 in accordance with an exemplary embodiment;

FIG. 7 is a partial, top view of the tip portion of FIGS. 4-6 in accordance with an exemplary embodiment; and FIG. 8 is a simplified, close up, cross-sectional view of a tip portion of a turbine rotor blade in accordance with an alternate exemplary embodiment.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Exemplary embodiments discussed herein are directed to turbine rotor blades capable of withstanding temperature environments that are higher than those for which conventional turbine rotor blades are designed. Generally, the improved turbine rotor blade includes a first parapet wall extending from the first side wall including a first tip edge, a second parapet wall extending from the second side wall opposite the first side wall and including a second tip edge, and a tip wall extending between the first side wall and the second side wall. To provide improved cooling, the turbine blade further includes at least one cavity within the one or more of parapet walls and one or more cooling holes, each having a centerline extending from the parapet wall cavity and through the parapet wall. The cavity may function to improve thermal management of the parapet wall.

Figure 1:
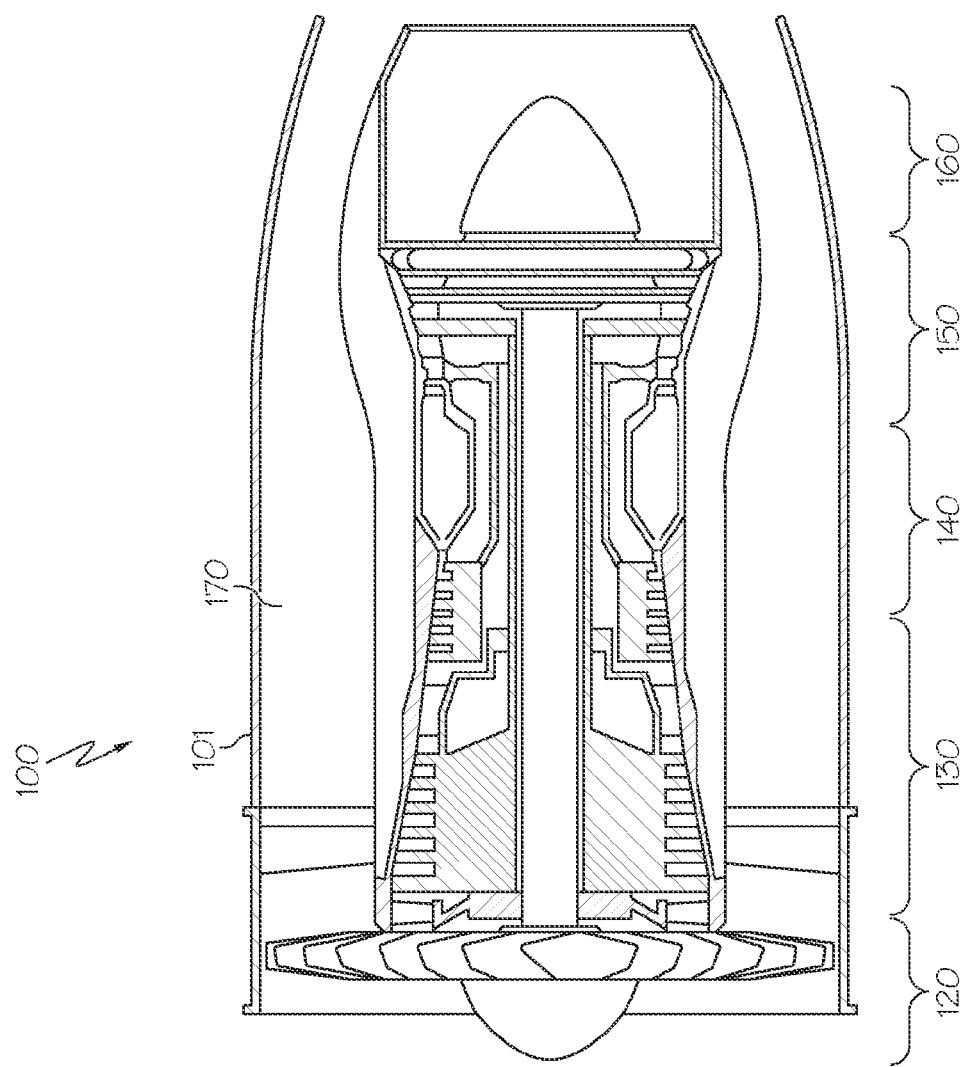
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
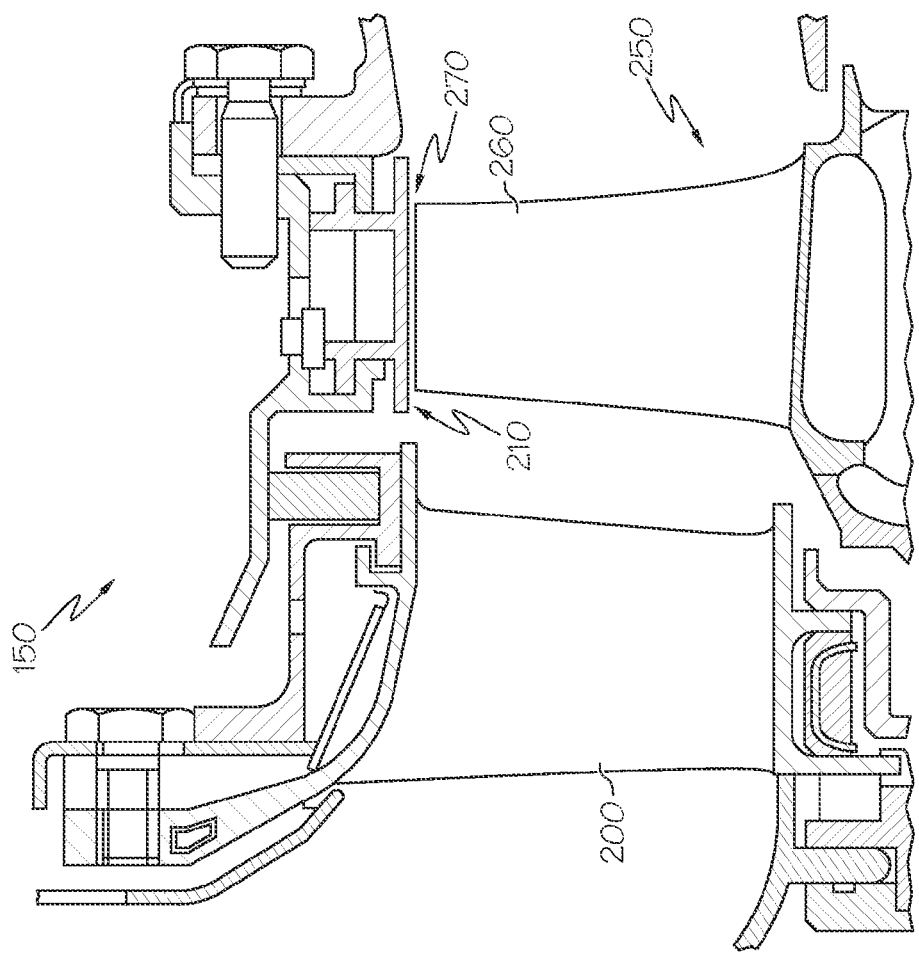
FIG. 2 is a partial, sectional elevation view of a portion of a turbine section of the gas turbine engine of FIG. 1 in accordance with an exemplary embodiment.

FIG. 2 is a partial, cross-sectional side view of a turbine section of an engine, such as the turbine section 150 of the gas turbine engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream compressor section (e.g. compressor section 130 of FIG. 1) is directed. The cylindrical shroud 210 is disposed concentric to the rotor 250 to optimize aerodynamic efficiency and forms a radial gap (i.e., blade running clearance) 270 with an outermost diameter of the rotor 250. The radial gap 270 is typically very small, for example, in a range of about 0.25 millimeter (mm) to about 0.50 mm. In other embodiments, the radial gap 270 may be larger or smaller than these ranges. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled. For example, the rotor blades 260 may be cooled as described in greater detail below.

Figure 3:
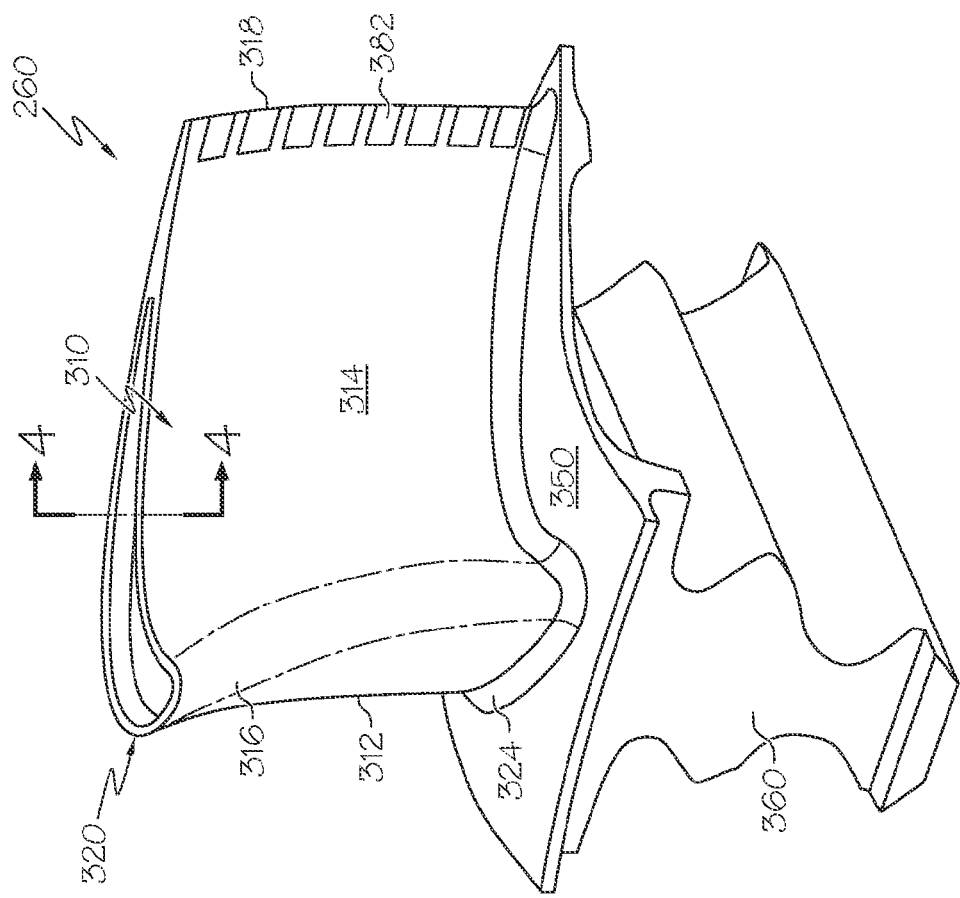
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform 350 and is configured to couple the rotor blade 260 to a turbine rotor disc (not shown). In this manner, a circumferential ring of blades 260 may be formed about the rotor disc for rotation. In general, the rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 has two side (or outer) walls 312, 314, each having outer surfaces that together define an airfoil shape. The first side wall 312 defines a suction side with a generally convex shape, and the second side wall 314 defines a pressure side with a generally concave shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics.

In an axial direction, the airfoil side walls 312, 314 extend from a base 324 at the platform 350 to a tip portion (or blade tip) 320. In general, the tip portion 320 is positioned to rotate in close proximity to the shroud 210 (FIG. 2) in order to maximize energy extraction, as introduced above.

As noted above, the rotor blade 260, particularly the airfoil 310, is subject to extremely high temperatures resulting from high velocity hot gases ducted from the combustion section 140 (FIG. 1). If unaddressed, the extreme heat may affect the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from inlets in the root 360 through internal cavities and passages to cool the airfoil 310 via convection and conduction. The air flowing through the internal cooling system may flow out of the airfoil 310 through trailing edge slots 382 to provide temperature control of the trailing edge 318. Additionally, the cooling air flowing through the internal cooling system may also be supplied to film cooling holes arranged to provide a cooling film of fluid onto the surface of the airfoil 310. Moreover, as described below, cooling holes are provided to cool the tip portion 320 and to improve engine efficiency.

Figure 4:
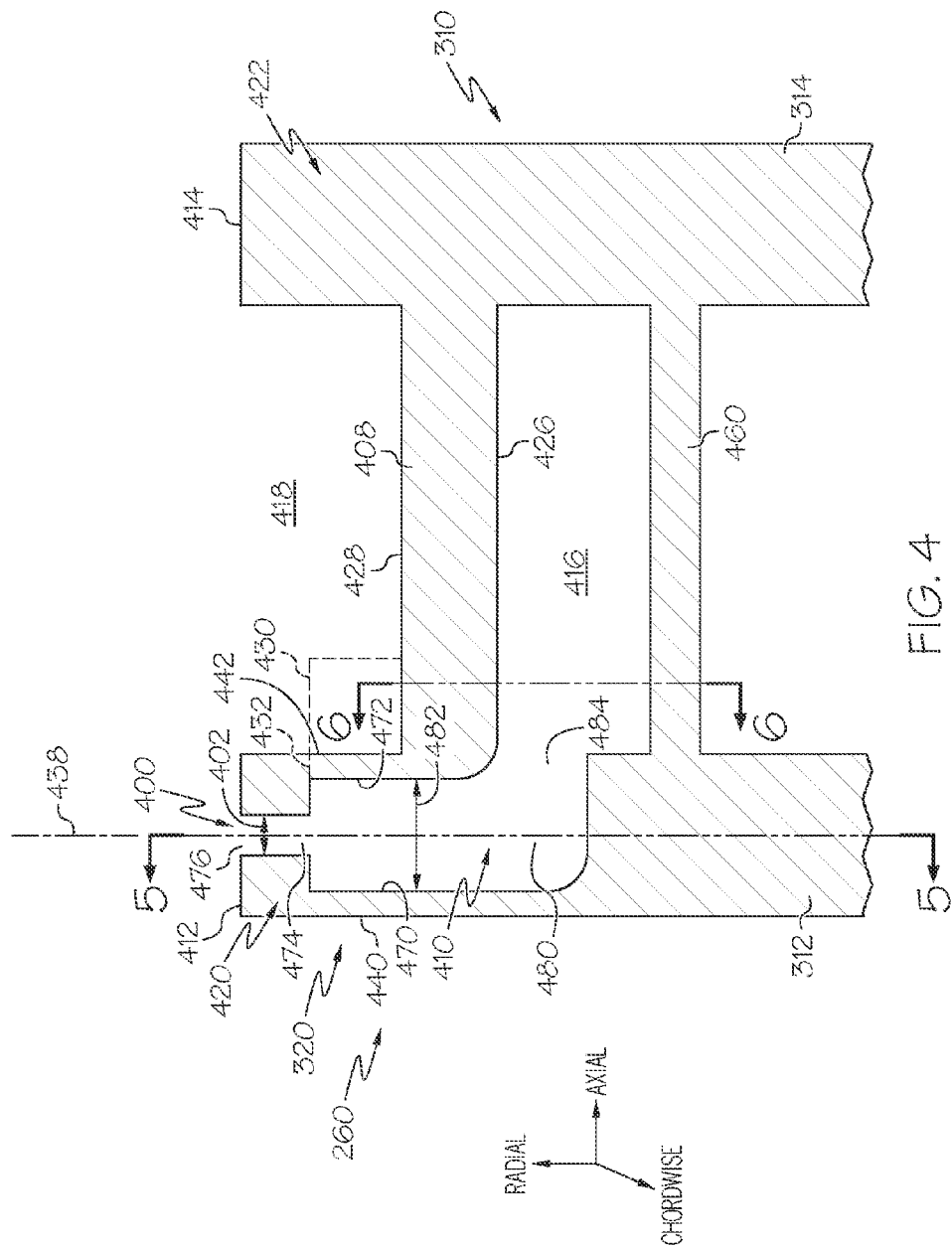
FIG. 4 is a simplified, close up, cross-sectional view of a tip portion of the turbine rotor blade through line 4-4 of FIG. 3 in accordance with an exemplary embodiment.

FIG. 4 is a partial cross-sectional view of the tip portion 320 of rotor blade 260 through line 4-4 of FIG. 3 in accordance with an exemplary embodiment. FIG. 4 particularly shows a portion of the interior structure of the rotor blade 260, which includes a portion of a tip cooling circuit 410 that receives a flow of cooling air from passages in the root 360 (FIG. 3) and/or rotor discs (not shown). Such cooling air may be obtained as bleed flow from the compressor section 130 (FIG. 1). As described below, the cooing air is directed through parapet wall cavities 480 and cooling holes 400 to cool the tip portion 320 and to improve engine efficiency.

As shown, the tip portion 320 may be considered to include a portion of the first side wall 312, a portion of the second side wall 314, a tip cap (or wall) 408, and interior wall 460, as well as the aspects of the tip cooling circuit 410 at least partially defined by these structures discussed below. At radial edges, the first side wall 312 defines a first tip edge 412, and the second side wall 314 defines a second tip edge 414. Although the first side wall 312 is described below, exemplary embodiments discussed herein are equally applicable to the second side wall 314. For example, the second side wall 314, including the second parapet wall 422, may incorporate the cooling holes and parapet wall cooling cavities discussed below.

The interior wall 460 extends between the first and second side walls 312, 314 and is generally formed in an axial-chordwise plane with a radial thickness. The airfoil 310 may have any number of internal structures. The tip cap 408 extends between the first side wall 312 and the second side wall 314 and is recessed from the first and second tip edges 412, 414 to define first and second parapet walls 420, 422 on the first and second side walls 312, 314, respectively. An exposed surface 428 of the recessed tip cap 408, the first parapet wall 420 on the first side wall 312, and the second parapet wall 422 on the second side wall 314 together form a tip recess cavity 418.

The parapet walls 420, 422 are substantially equal in height (as measured from the exposed surface 428 of the tip cap 408 to the first and second tip edges 412, 414, respectively), as depicted in FIG. 4. Though not illustrated, in another embodiment, one of the parapet walls 420, 422 is shorter than the other such that a height difference exists therebetween, e.g., between about 0.05 mm and about 0.40 mm in height difference, as well as larger or smaller height differences.

Similarly, the parapet walls 420, 422 may have approximately equal thicknesses or different thicknesses. In one exemplary embodiment, the first parapet wall 420 is about 1.30 to about 2.7 times thicker than the second parapet wall 422, although other relative thicknesses may be provided.

A tip cap cooling channel 416 is defined by an interior surface 426 of the tip cap 408, the interior wall 460, and the first and second side walls 312, 314. The cooling channel 416 may have any suitable configuration for delivering cooling air. In one exemplary embodiment, the cooling channel 416 delivers air to a parapet wall cavity 480, which in turn, provides cooling air to one or more of the cooling holes 400, as will be discussed in greater detail below. Although not shown, the cooling channel 416 may have any suitable type of flow accelerators or turbulators on the tip cap 408 and/or interior wall 460 to condition air flow, as necessary or desired.

Figure 5:
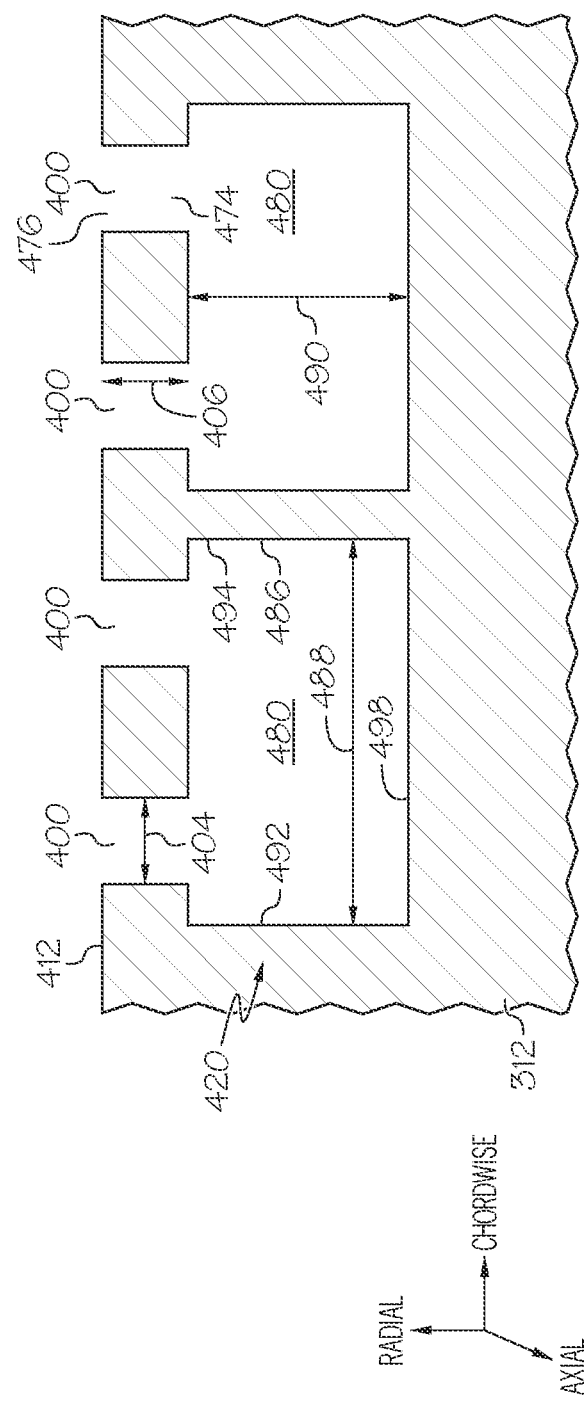
FIG. 5 is a simplified, close up, cross-sectional view of the tip portion of the turbine rotor blade through line 5-5 of FIG. 4 in accordance with an exemplary embodiment.

Additional details about the cooling circuit 410, including the parapet wall cavities 480 and cooling holes 400 will now be provided with reference to FIGS. 4-7. FIG. 5 is a simplified, close up, cross-sectional view of the tip portion 320 through line 5-5 of FIG. 4 in accordance with an exemplary embodiment. FIG. 6 is a simplified, close up, cross-sectional view of the tip portion 320 through line 6-6 of FIG. 4 in accordance with an exemplary embodiment. FIG. 7 is a partial, top view of the tip portion 320 of FIGS. 4-6 in accordance with an exemplary embodiment.

As noted above, one or more parapet wall cavities 480 are formed within the parapet wall 420 and fluidly coupled to one or more of the cooling holes 400 and the cooling channel 416. As best shown in FIG. 4, parapet wall cavity 480 extends from the cooling channel 416, into the side wall 312, through the tip cap 408, through the parapet wall 420, and to the cooling hole 400. Still referring to FIG. 4, the parapet wall cavity 480 is defined in the axial direction by the interior surface 470 of a aft parapet wall portion (and/or aft suction side wall portion) and the interior surface 472 of a forward parapet wall portion (and/or forward suction side wall portion).

As best shown in FIG. 5, a number of parapet wall cavities 480 may extend along the interior of the parapet wall 420. In the view of FIG. 5, two parapet wall cavities 480 are depicted, although any number of parapet wall cavities 480 may be provided along the length of the parapet wall 420. As shown, adjacent parapet wall cavities 480 are separated by a support wall 486. The support wall 486 extends along the radial length as part of the parapet wall 420. The support walls 486 may provide structural support for the parapet wall 420, as well as improve vibrational control. Although a support wall 486 separates the parapet wall cavities 480 in the depicted embodiments, only a single or common parapet wall cavity may be provided such that support wall 486 may be omitted.

As referenced above, the parapet wall 420 further includes one or more cooling holes 400. Each cooling hole 400 extends from the parapet wall cavity 480 to one of the exterior surfaces of the parapet wall 420. In the depicted embodiment, each cooling hole 400. has a centerline 438 and extends continuously from the parapet wall cavity 480 through the exterior surface on the parapet wall cavity 480. In the depicted embodiment, the cooling hole 400 has an inlet 474 opening to the parapet wall cavity 480 and an outlet 476 at the first tip edge 412. As such, the inlet 474 of each cooling hole 400 is considered within the interior of the parapet wall cavity 480. Reference is briefly made to FIG. 7, which is a partial top view corresponding to the partial cross-sectional view of FIG. 5 and depicts the cooling holes 400 separated by portions of the first tip edge 412. As shown, the cooling holes 400 extend along the chord-length of the parapet wall 420. Any number of cooling holes 400 may be provided.

In the depicted embodiment, the centerline 438 of each cooling hole 400 extends through the radial center of the parapet wall 420. In other embodiments, the centerline 438 may be angled relative to the radial center of the parapet wall 420 with the outlet 476 positioned on the first tip edge 412 such that the cooling air exiting cooling hole 400 is angled, e.g., towards or away from a streamwise direction of airflow. The outlets 476 of cooling holes 400 may be positioned on other exterior surfaces of the parapet wall 420. In some embodiments, the cooling holes 400 may be curved or angled such that the outlets 476 of the cooling holes 400 are on the side surface 442 of the parapet wall 420 facing the tip cap cavity 408 and/or on the side surface 440 on the opposite side of the parapet wall 420.

The cooling holes 400 may have any suitable cross-sectional shape, including oval, circular, or other shapes. Typically, each cooling hole 400 has a generally constant cross-sectional shape and cross-sectional area. However, in other embodiments, each cooling hole 400 has a varying cross-sectional shape and cross-sectional area. For example, the cross-sectional shape of the cooling hole 400 may decrease or taper long the radial length to the outlet 476.

As one example of a further exemplary embodiment, the tip portion 320 may have a step 430 (indicated in dashed lines) between the parapet wall 420 and the tip cap 408. The step 430 may extend to a height less than the first tip edge 412 and along at least a portion of the chordwise length of the parapet wall 420. In such an embodiment, the cooling hole 400 may have an open channel configuration relative to the edge surface of the parapet wall 420 relative to the tip cap cavity 418. For example, the open channel of the cooling hole 400 may be formed by removing, in an axial direction, a portion of the parapet wall 420, as indicated by dashed line 432. A portion of the cooling hole 400 may additionally extend through the step 430. This embodiment may prevent and/or mitigate blockages of the cooling holes 400 if the first tip edge 412 rubs against the shroud 210 (FIG. 2) during operation.

Returning to the view of FIG. 5, each parapet wall cavity 480 in the depicted embodiment is fluidly coupled to two cooling holes 400. In some exemplary embodiments, each parapet wall cavity 480 may be fluidly coupled to only a single cooling hole 400, while in other embodiments each parapet wall cavity 480 may be fluidly coupled to more than two holes 400, including three, four, or more cooling holes 400. In general, however, the parapet wall cavity 480 will feed cooling air to at least two cooling holes 400 such that those cooling holes 400 are fluidly coupled together within the parapet wall 420. Additional details about the parapet wall cavities 480 will now be provided.

In general, the parapet wall cavity 480 may have any suitable size and shape. In one exemplary embodiment, best shown by FIG. 4, the parapet wall cavity 480 may have a resulting width 482 (e.g., in an axial direction of an axial-chordwise plane) that is greater than a width 402 of each cooling hole 400. In another exemplary embodiment, the parapet wall cavity 480 may have a resulting width 482 that is approximately equal to the width 402 of each cooling hole 400 and/or more narrow than the width 402 of each cooling hole 400. The width 482 of the cavity 480 may be determined, for example, by the minimal width (or thickness) of the cavity walls, e.g., the parapet wall portions on either side of the cavity 480. In one exemplary embodiment, the thickness of these wall portions (e.g., the distance between interior surface 470 and aft surface 442 and the distance between the interior surface 472 and suction side tip cavity surface 442) may approximately 0.015 inches, although other thickness may be provided.

Typically, and referring to FIG. 5, each parapet wall cavity 480 has a chordwise length 488 that is greater than at least one of the hole lengths 404. As shown in the depicted embodiment, the parapet wall cavity 480 has a chordwise length 488 that is greater than two or more hole lengths 404.

As also shown in FIG. 5, and additionally referring to FIG. 4, the parapet wall cavities 480 may have any suitable height 490 in the radial direction. In the depicted embodiment, the parapet wall cavity 480 has a height 490 that is greater than a length (or height) 406 of each cooling hole 400. In one exemplary embodiment, the height 490 may be determined, for example, by the minimum thickness of the cavity walls, e.g., the parapet wall portions on a top side of the cavity 480, in consideration of manufacturing and durability issues. In one exemplary embodiment, the thickness of these wall portions may correspond to the length 406 of the cooling hole 400 may approximately 0.015 inches, such that the size of the cavity 480 may be maximized given the minimum wall portion thicknesses. Other heights or height ratios may be provided. In various exemplary embodiments, the parapet wall cavity 480 may be considered to have a height 490 that is more than half, more than 75%, more than 90%, or more than 95% of the parapet wall height.

As best shown in FIG. 5, the parapet wall cavities 480 may be considered to have a rectangular cross-sectional shape in the radial-chordwise plane. As such, the parapet wall cavities 480 may have straight side walls 492, 494 extending in the radial direction and a straight bottom wall 498 extending in the chordwise direction. As described below, the parapet wall cavities 480 may have other configurations. For example, the parapet wall cavities 480 may have configurations that increase or maintain flow velocities and/or preventing flow losses, as necessary or desired.

As best shown in FIG. 6, which is a view through the cooling channel 416 in the direction of the parapet wall cavity 480, the parapet wall cavity 480 is coupled to the cooling channel 416 at inlet 484. In FIG. 6, two inlets 484 are depicted, and the inlets 484 are associated with two parapet wall cavities 480. The inlets 484 shown in FIG. 6 are respectively associated with the parapet wall cavities 480 shown in FIG. 5. In other embodiments, one inlet 484 may direct air into any number of cavities 480, including two or more cavities 480, and in further embodiments, more than one inlet 484 may be associated with a single common cavity 480. In general, the inlets 484 may have any suitable size and shape. In the depicted embodiment, the inlets 484 are oval.

As such, during operation, cooling air flows through the cooling channel 416, typically in a chordwise direction along the chordwise length of the rotor blade 260. Portions of the cooling air flow through the inlets 484 and into the parapet wall cavities 480. Each parapet wall cavity 480 directs the cooling air into one or more cooling holes 400, and the cooling holes 400 direct the cooling air out of the parapet wall 420. As a result of this arrangement, cooling of the tip portion 320 of the rotor blade 260 is improved, particularly within the parapet walls 420 via convective and conductive cooling. In one exemplary embodiment, the parapet wall cavities 480 provide additional surface area within the interior of the parapet wall 420, thus resulting in improved convective cooling and additionally resulting in improved conductive paths for removing heat from problematic areas in the tip portion 320, thereby reducing temperature gradients between the tip cap 408 and parapet wall 420. Upon flowing through the parapet wall cavities 480, the cooling air flows through the cooling holes 400, which provides additionally convective cooling to the tip portion 320 and particularly may provide a film of cooling air on the exterior portions of the tip portion 320. As noted above, although the cavities 480 and cooling holes 400 may be provided on the suction side to cool the suction side parapet wall 420, including the forward suction side surface of the parapet wall 420, the radial edge 412 of the parapet wall 420, and the aft suction side surface of the parapet wall 420, the cavities 480 and cooling holes 400 may additionally be provided on the pressure side to cool the pressure side parapet wall 422, including the forward pressure side surface of the parapet wall 422, the radial edge 414 of the parapet wall 422, and the aft pressure side surface of the parapet wall 422.

FIG. 8 is a simplified, close up, cross-sectional view of a tip portion 720 of a turbine rotor blade 660 in accordance with an alternate exemplary embodiment. In general, FIG. 8 corresponds to the view of FIG. 5 discussed above. As such, the tip portion 720 includes a parapet wall cavity 880 formed in a parapet wall 820. The parapet wall cavity 880 is fluidly coupled to cooling holes 800, as in the embodiments discussed above. In this exemplary embodiment, the parapet wall cavity 880 has side walls 892, 894 that are angled relative to a radial direction. In this exemplary embodiment, the side walls 892, 894 are angled towards one another such that the parapet wall cavity 880 has a tapered cross-sectional area and/or a trapezoidal cross-sectional shape. Other parapet wall cavity shapes and configurations may be provided.

The exemplary embodiments discussed above may be manufactured in any suitable ways. For example, the rotor blade, including a tip portion with parapet walls and tip portion cooling circuit, may be formed by a lost wax casting process, additive manufacturing techniques, or any other suitable process.

As a result, the cooling holes discussed above enable closer clearances between the turbine rotor blades and the shroud, thereby reducing or mitigating tip leakage flow over gas turbine blades is a source of efficiency loss and consequently an undesirable increase in overall engine Specific Fuel Consumption (SFC). Additionally, the improved tip portion cooling may enable a reduction in cooling air that may be used in other locations and/or redirected to mainstream gas flow. The increase in efficiency resulting from the cooling air provided to the tip portion through the cooling holes may more than make up for the efficiency cost of supplying the cooling air, particularly as a result of the converging nature of the corresponding high pressure and velocity. Exemplary embodiments of the turbine blades discussed above have resulted in an ability to increase engine temperature, thereby improving fuel consumption.

Computational fluid dynamic (CFD) analysis may be used to optimize the location and orientation of the cooling holes. Exemplary embodiments provide a cooling feed right in the tip portion to ensure optimal internal convective cooling, optimal external film cooling orientation, and manufacturing robustness to bridge the gap between casting core shift and machining true positional tolerancing. In particular, one possible advantage of such exemplary embodiments is that the designer now has the freedom to optimize internal cooling and external film cooling at the tip portion without convention restrictions on film cooling hole associated with true positioning and geometry, e.g., in some conventional designs, the machining holes must be oriented to ensure penetration into the tip cap core, which limits the options for film cooling geometry.

Exemplary embodiments promote the service life and/or enhanced performance in a cost-effective manner. The turbine blades produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine rotor blade for a turbine section of an engine, the turbine rotor blade comprising:
   a platform; and
   an airfoil extending from the platform into a mainstream gas path of the turbine section, the airfoil comprising
   a first side wall;
   a second side wall joined to the first side wall at a leading edge and a trailing edge;
   a tip cap extending between the first side wall and the second side wall;
   a first parapet wall extending from the first side wall;
   a first parapet wall cavity formed at least partially within the first parapet wall; and
   a first cooling hole extending between the first parapet wall cavity and a first surface of the first parapet wall such that cooling air flows through the first parapet wall cavity, through the first cooling hole, and out of the first parapet wall, wherein the airfoil further comprises additional parapet wall cavities formed at least partially within the first parapet wall and extending in a generally chordwise direction; and additional cooling holes extending between the additional parapet wall cavities and the first surface of the first parapet wall, wherein at least two of the additional cooling holes extend from each of the additional parapet wall cavities, and wherein the first parapet wall further includes a support wall extending in a radial direction between each of adjacent additional parapet wall cavities.

2. The turbine rotor blade of claim 1, wherein first side wall is a suction side wall.

3. The turbine rotor blade of claim 1, wherein the tip cap, the first side wall, and the second side wall at least partially define a cooling channel within the airfoil, and wherein the first parapet wall cavity is fluidly coupled to the cooling channel such that the cooling air flows from the cooling channel into the first parapet wall cavity.

4. The turbine rotor blade of claim 1, wherein the first surface of the parapet wall is a radial tip edge.

5. The turbine rotor blade of claim 1, wherein the airfoil further comprises a second cooling hole extending between the first parapet wall cavity and the first surface of the first parapet wall.

6. The turbine rotor blade of claim 5, wherein the first cooling hole has a first cooling hole inlet at the first parapet wall cavity and the second cooling hole has a second cooling hole inlet at the first parapet wall cavity.

7. The turbine rotor blade of claim 6, wherein the first and second inlets are positioned within an interior of the first parapet wall.

8. The turbine rotor blade of claim 1, wherein the first parapet wall cavity has a chordwise length that is at least twice as long as a diameter of the first cooling hole.

9. The turbine rotor blade of claim 1, wherein the first cooling hole has an outlet at least partially formed in a side surface of the first parapet wall facing the tip cap.

10. The turbine rotor blade of claim 1, wherein the first parapet wall cavity has generally straight side walls extending in a radial direction.

11. The turbine rotor blade of claim 1, wherein the first parapet wall cavity has a rectangular cross-sectional shape in a radial-chordwise plane.

12. The turbine rotor blade of claim 1, wherein the first parapet wall cavity has generally angled side walls extending in a radial direction.

13. The turbine rotor blade of claim 1, wherein the first parapet wall cavity has a trapezoidal cross-sectional shape in a radial-chordwise plane.

14. The turbine rotor blade of claim 1, wherein the first parapet wall cavity extends through at least half of a radial height of the first parapet wall.

15. The turbine rotor blade of claim 1, wherein the first parapet wall cavity has a radial height greater than a length of the first cooling hole.

16. An airfoil for a turbine blade, the airfoil comprising
a first side wall;
a second side wall joined to the first side wall at a leading edge and a trailing edge;
a tip cap extending between the first side wall and the second side wall;
a first parapet wall extending from the first side wall;
a first parapet wall cavity formed at least partially within the first parapet wall; and
a first cooling hole extending between the first parapet wall cavity and a first surface of the first parapet wall such that cooling air flows through the first parapet wall cavity, through the first cooling hole, and out of the first parapet wall;
at least one additional parapet wall cavity formed at least partially within the first parapet wall and extending in a generally chordwise direction; and
at least one additional cooling hole extending between the additional parapet wall cavity and the first surface of the first parapet wall, and wherein the first parapet wall further includes a support wall extending in a radial direction between the first parapet wall cavity and the at least one additional parapet wall cavity.

17. The airfoil of claim 16, wherein first side wall is a suction side wall.

18. The airfoil of claim 16, wherein the tip cap, the first side wall, and the second side wall at least partially define a cooling channel within the airfoil, and wherein the first parapet wall cavity is fluidly coupled to the cooling channel such that the cooling air flows from the cooling channel into the first parapet wall cavity.

* * * * *